INVENTOR.
DAVID GEORGE CARL
BY
J. R. Nelson and
W. A. Schaich
ATTORNEYS

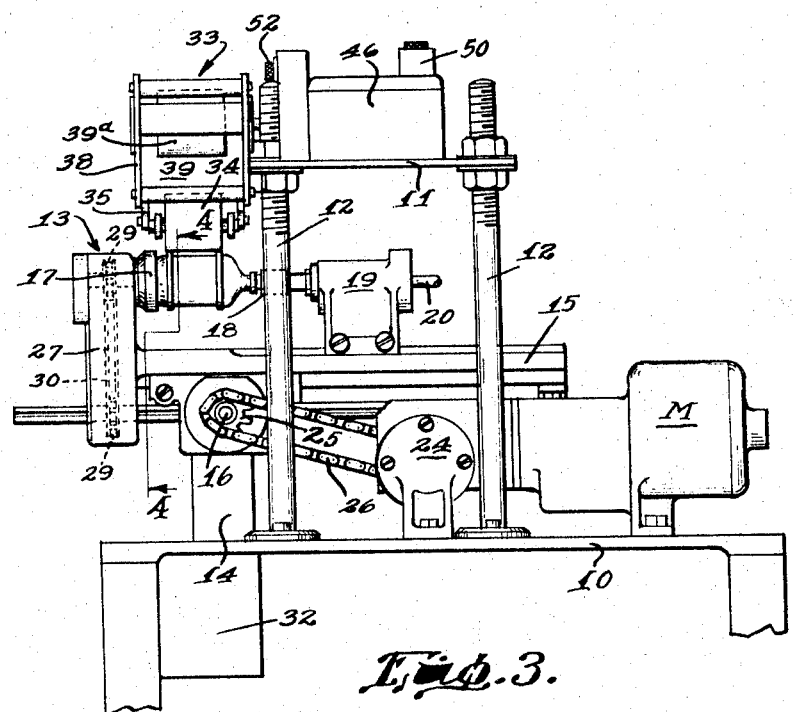

United States Patent Office 3,453,982
Patented July 8, 1969

3,453,982
BANDING MACHINE
David George Carl, Sylvania, Ohio, assignor to Owens-Illinois, Inc., a corporation of Ohio
Filed July 11, 1966, Ser. No. 564,185
Int. Cl. B05c 11/12
U.S. Cl. 118—6                        8 Claims

ABSTRACT OF THE DISCLOSURE

Apparatus for banding non-circular surfaces (oval bottles for example) wherein one of two horizontal coaxial article-supporting chucks is rotated by a variable-speed brake-embodying D.C. electric motor and wherein a position adjustable limit-switch for controlling operation of the motor, is actuated by a swingable banding-roll carrying arm as it moves the roll toward the surface being banded, the motor functioning to stop chuck rotation instantly at the end of each banding operation and thereby properly position such chunk for easy loading and unloading.

---

My invention relates to banding machines of that type utilized in applying one or more bands of a suitable paint to the exterior surface of glass containers or other articles.

In general my banding machine is that shown in Medert et al. Patent No. 2,920,556, issued Jan. 12, 1960, and assigned to the assignee of my present application. In that patent, however, the machine illustrated has only limited use in that it can band or decorate only cylindrical surfaces, whereas in the trade there are many bottles, etc. of non-circular form whose appearance would be materially enhanced by the addition of colored bands as an exterior surface decoration.

Accordingly, an important object of my invention is the provision of a machine such as is shown in said patent, but modified in simple fashion so that it can band both circular and non-circular surfaces with equal ease and productive efficiency.

It is also an object of my invention to provide means whereby a rotary article holder which supports the article (an oval bottle or flask) during the banding cycle, will automatically stop rotation in a preselected position at the conclusion of each cycle, the angular position having been predetermined by the operator with a view toward minimizing article manipulation during the holder or chuck loading operation. Thus, if, for example, the operator would normally and most conveniently hold the bottles (oval) with the long axis of the oval disposed in a nearly vertical plane, then it is, of course, desirable that the long axis of the oval bottle receiving cavity in the chuck be at the outset positioned in a nearly vertical plane. Otherwise repeated changing of the position of the bottle in the operator's hand would be essential as part of each loading operation.

Another object of my invention is the provision of means in a machine of the type shown in the Medert et al. patent for delaying lowering the banding or band applicator roll into contact with the chucked bottle or other article, until the chuck has finally and firmly grasped such article. Thus, cocking or misalignment of the article and consequent improper decoration are avoided.

A further object of my invention is the provision of a variable speed brake embodying motor for rotating a chucked bottle in contact with a rotary banding roll, there being a limit switch actuated in response to moving the roll into and out of contact with the bottle and to first initiate motor operation and then cut off current to the motor at the end of a timer controlled period of banding, the motor and chuck stopping instantly with the latter positioned angularly as pointed out above.

It is likewise an object of my invention to provide a banding roll, which, incident to movement thereof toward the surface to be banded, operates means for initiating rotation of the bottle holder or chuck so that rotation of the bottle will have begun when contact between the roll and bottle is effected.

Other objects will be in part apparent and in part pointed out hereinafter.

In the accompanying drawings forming a part of my application.

FIG. 3 is a fragmentary side elevational view of the machine.

FIG. 4 is a detailed sectional elevational view taken along the line 4—4 of FIG. 3.

Figure 1:
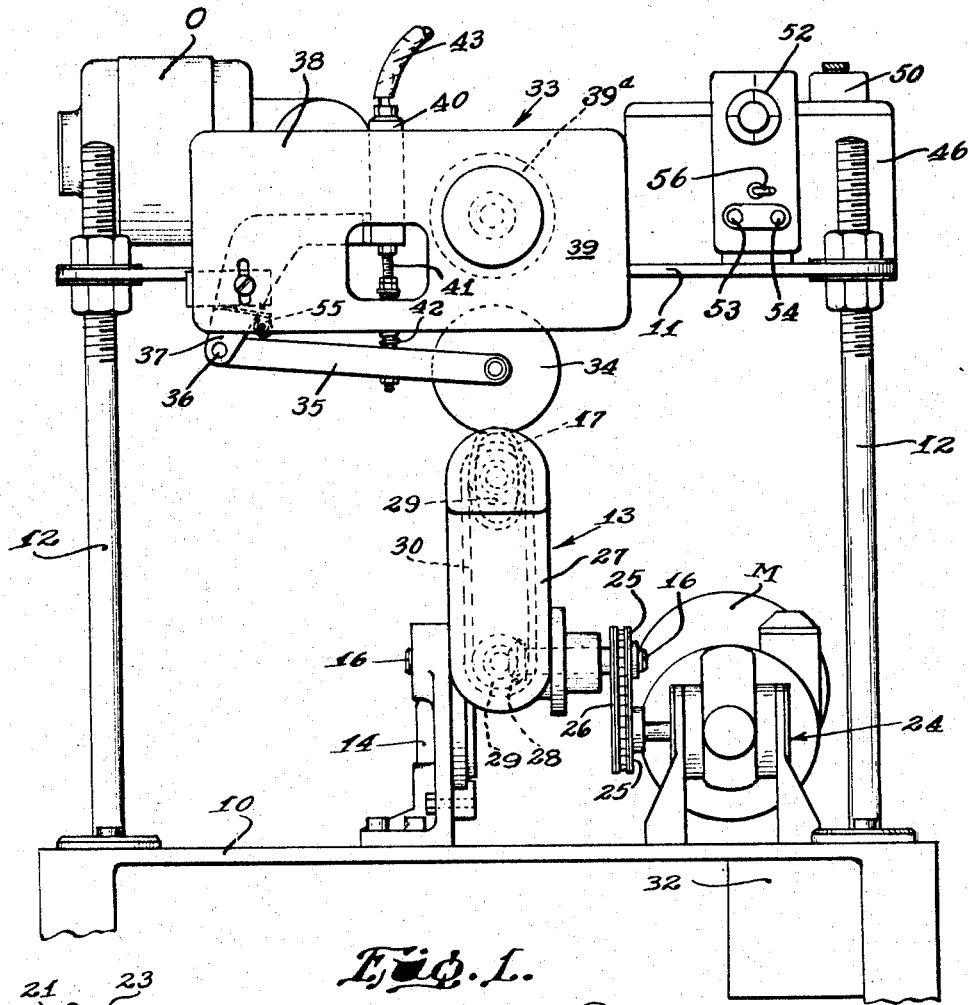
FIG. 1 is a front elevational view of a banding machine of the type shown in said Medert et al. patent, modified to incorporate my invention.

In the illustrated embodiment of my invention it is incorporated in a machine comprising a base platform 10, and an upper platform 11, these being disposed horizontally and interconnected by a plurality of vertical posts 12. An article holder 13 is supported on a bracket 14 (FIG. 1) rising from the base platform 10, such holder comprising a vertically swingable frame 15 rockable on the axis of a horizontal shaft 16. A driven base chuck 17 and a freely rotatable neck chuck 18 having aligned axes are supported on said frame 15. The neck chuck 18 which is air operated is mounted for axial movement relative to the base chuck 17 to accommodate articles of different length. The neck chuck embodies an air-operated piston motor 19 connected by a pipe 20 to an air line 21 which is provided with a valve 22 operable by a foot pedal 23.

The base chuck 17 is rotated by means of the variable speed brake embodying D.C. electric motor M which operates through a speed reduction gear unit 24, sprockets 25 and chain 26 to rotate the shaft 16. This shaft 16 is journaled in the bracket 14 and through gears 28, sprockets 29 and a sprocket chain 30 rotates the base chuck, as will be apparent. The motor M receives its power from a main line 31 through a rectifier 32 and switches which will be described presently.

The band applicator unit 33 comprises a paint or banding roll 34 supported at the free end of a vertically rockable arm 35 which is connected by a horizontal pivot pin 36 to a bracket 37 affixed to the frame 38. This frame supports an ink or paint receptacle 39 and an inking roll 39a which applies a thin film or paint to the periphery of the banding roll 34 for transfer as a band or bands to the article being decorated. This banding roll 34 is moved up and down by an air-operated piston motor 40 having a piston rod 41 and compression coil spring 42 connection to the ink roll supporting arm 35. This spring is adjustable to regulably control the pressure of the roll on the workpiece. A pipe 43 connects the piston motor 40 to the supply line 21 and a normally closed solenoid valve 44, the solenoid being electrically connected to the main line 31 through leads 45 and a timer 46 of conventional or some preferred form. When the foot pedal 23 is depressed by the operator, air cylinder 48 receives air under pressure from the supply line 21 and operates a switch 49 or contact device which in turn is connected to the aforementioned timer 46 through a conventional adjustable time delay relay device 50. The ink roll 39a is rotated by means of a motor O operating through reduction gearing and sprockets, etc. as in the Medert et al. patent. A switch 51 controls flow of electric current to the motor O. Adjustment or setting of the time delay relay serves to insure that the banding or applicator roll 34 does not contact the bottle until the neck chuck 18 has firmly engaged the bottle and is securely holding it in the base chuck 17.

Figure 2:
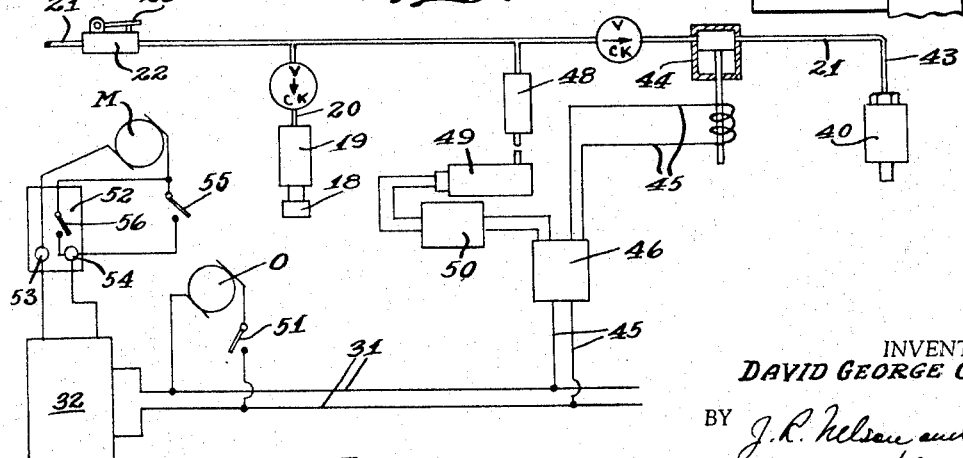
FIG. 2 is a piping and electric wiring diagram.

Referring particularly to FIG. 2, the base chuck rotating motor M is connected to the rectifier 32 through control devices including a conventional variable speed motor control device 52, a start switch 53 and a stop switch 54. In circuit with the stop switch 54 is a normally open limit switch 55 which, it will be observed (FIG. 1), is mounted on the frame 38 which supports the banding roll arm 35. This limit switch 55 is adjustable vertically so that it may close as required by the cross-sectional dimensions of the article being banded. Thus, with a substantial degree of downward movement of the banding roll 34 to contact a small diameter bottle, the limit switch 55 would be in a comparatively low position so that it would be closed by lowering of the arm 35, only at the moment the banding roll 34 contacts the bottle. Consequently the bottle chuck does not begin to rotate until contact has been made between the banding roll and bottle. This, of course, may be varied, if desired, and would not necessarily be practiced if found or cylinder-like bottles were being banded. A "jog or run" switch 56 (FIGS. 1 and 2) is in a circuit by-passing the limit switch 55. This switch 56, when closed, permits the chuck rotating motor M to run continuously, as when round bottles are being banded and periodic stopping of the base chuck rotation is not essential. However, when oval bottles are being banded and termination of rotation of the base chuck 17 in a predetermined angular position is desired, the "jog and run" switch is closed for very short periods of time to "jog" the base chuck to the desired starting and stopping angular position. The "jog and run" switch 56 then is left open. Since the speed, or r.p.m.'s, of the motor M is adjustable and incident to opening of the limit switch 55, stops instantly, with no over-running, the motor and chuck will stop at the end of each banding cycle in the position that has been preselected by the operator through manipulation of the "jog and run" switch 56. It is understood that the timer 46 directly determines the duration of the banding cycle and hence is tied in with the motor speed so as to insure periodic cessation of the chuck rotation as desired.

Thus the operator, in using a machine as described above, will know in advance precisely the angular position in which the bottle chuck will stop (such having been preselected by the operator), and be able to handily remove such bottle when he or she releases the foot pedal 23. At the same time the operator will have in one hand a second bottle ready for placement in the chuck. Since the operator knows in advance the precise angular position at which the chuck will stop rotating, he or she will have the unbanded bottle properly positioned in his or her hand for quick insertion in the chuck. Thus efficient use of the machine is readily possible.

In the event the bottle shape is such that its ends are tapered, for example, banding of one at a time will be imperative. To band such a bottle, the holder, including the base and neck chucks 17 and 18 respectively, will be angularly adjusted on the axis of the shaft 16 so that the surface to be banded will properly contact the banding roll 34. Upon completion of banding one end, the bottle will be reversed as to position in the holder and the banding operation repeated. The base chuck, of course, would have a depression (not shown) to accommodate the neck of the bottle.

Modifications may be resorted to within the spirit and scope of the appended claims.

I claim:

1. In a machine for applying a decorative band circumferentially of the exterior surface of a non-circular article, an article holder comprising a rotatable base chuck having a cavity shaped to receive and conform to the configuration of an end of the non-circular article, a neck chuck coaxial with the base chuck, a brake embodying direct current electric motor unit for rotating the base chuck, an applicator roll positioned above the article holder, and rotatable on a substantially horizontal axis, means for applying a film of banding material to the periphery of the roll, means for moving the roll into and out of contact with an article supported in said chucks, and means operable in response to movement of the banding roll toward the article for starting operation of the base chuck rotating motor.

2. In a machine as defined in claim 1, the last-named means being a limit switch and a rockable arm supporting the inking roll and incident to such rocking alternately closing and opening said switch.

3. A machine as defined in claim 1, and means including a manually operable electric switch for jogging the chuck rotating motor thereby to place the chuck in a preselected angular position preparatory to initiating a production run.

4. In a machine as defined in claim 1, the last named means comprising a limit switch and a vertically rockable roll supporting arm controlling operation of said switch.

5. In a machine as defined in claim 1, said means for moving the roll comprising a pivoted vertically rockable arm supporting the roll at its free end, means for rocking the arm and the means for starting operation of the base chuck rotating motor being at least in part a limit switch operable by and in response to rocking of said arm.

6. In a machine as defined in claim 1, there being an adjustable time delay relay for delaying contact between the applicator roll and article until the latter has been firmly grasped by the chucks.

7. A machine as defined in claim 4 and a vertically adjustable bracket supporting the limit switch whereby to vary the time of initiating the base chuck rotating motor operation in relation to the vertical movement of the banding roll.

8. In a machine as defined in claim 4, there being an adjustable time delay relay for delaying contact between the applicator roll and article until the latter has been firmly grasped by the chucks.

References Cited

UNITED STATES PATENTS

| 751,783 | 2/1904 | Collin. | |
|---|---|---|---|
| 1,718,047 | 6/1929 | Hunker | 101—38 XR |
| 2,045,881 | 6/1936 | Strider | 101—38 XR |
| 2,467,697 | 4/1949 | Ralston et al. | 101—114 XR |
| 2,920,556 | 1/1960 | Medert et al. | 101—38 |
| 3,110,247 | 11/1963 | Simpson | 101—38 |
| 3,190,463 | 6/1965 | Cohan | 101—38 XR |
| 3,249,043 | 5/1966 | Karlyn et al. | 101—38 |

ROBERT E. PULFREY, *Primary Examiner.*

CLIFFORD D. CROWDER, *Assistant Examiner.*

U.S. Cl. X.R.

101—38; 118—12, 232, 243, 503